Aug. 5, 1958  A. JOHANNSEN ET AL  2,846,291
PROCESS AND APPARATUS FOR THE PRODUCTION OF
GASES CONTAINING SULFUR TRIOXIDE
Filed May 29, 1953  2 Sheets-Sheet 1
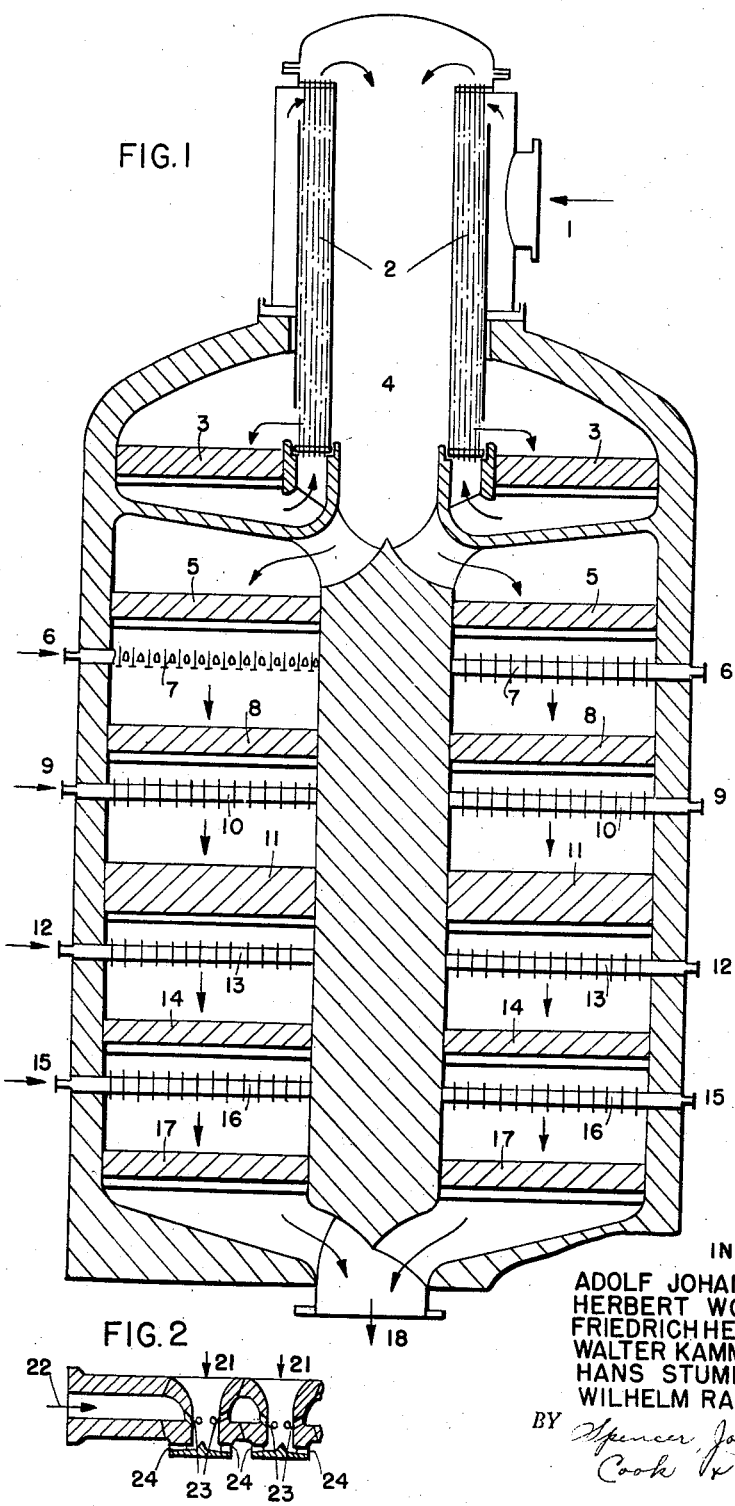
INVENTORS:
ADOLF JOHANNSEN
HERBERT WOLF
FRIEDRICH HETTLER
WALTER KAMMERER
HANS STUMPFI
WILHELM RASCHE
BY Spencer Johnston
Cook & Root
ATT'YS

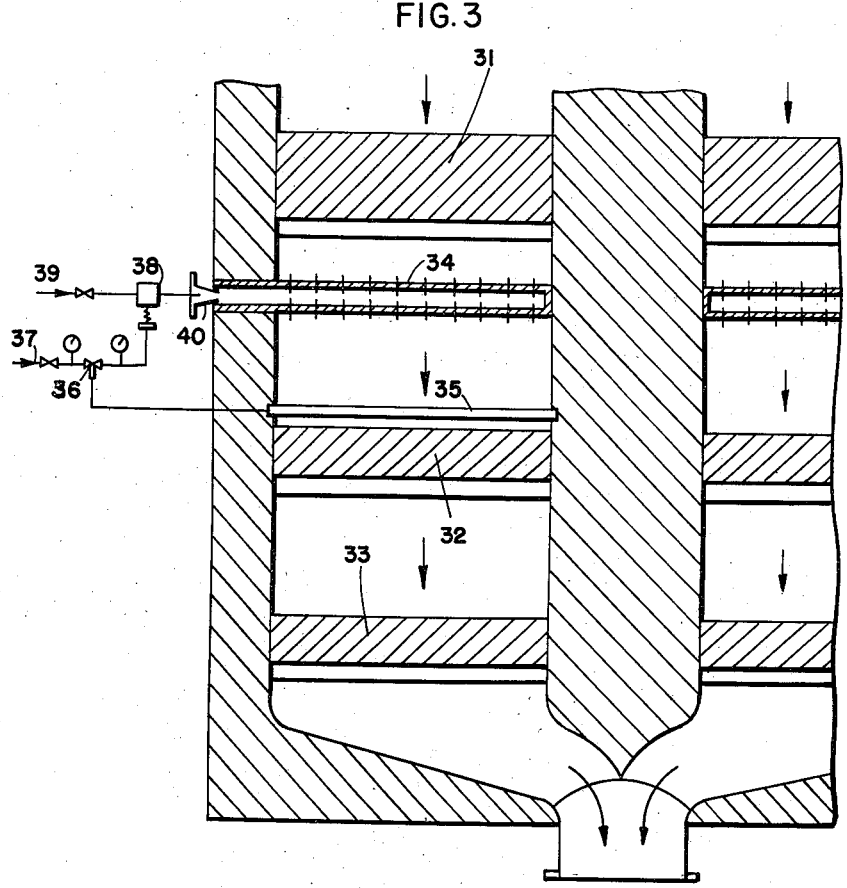

United States Patent Office 2,846,291
Patented Aug. 5, 1958

2,846,291

PROCESS AND APPARATUS FOR THE PRODUCTION OF GASES CONTAINING SULFUR TRIOXIDE

Adolf Johannsen and Herbert Wolf, Ludwigshafen (Rhine), Friedrich Hettler, Bad Duerkheim, and Walter Kammerer, Hans Stumpfi, and Wilhelm Rasche, Ludwigshafen (Rhine), Germany, assignors to Badische Anilin- & Soda-Fabrik Aktiengesellschaft, Ludwigshafen (Rhine), Germany Application May 29, 1953, Serial No. 358,318

Claims priority, application Germany May 31, 1952

6 Claims. (Cl. 23—176)

This invention relates to improvements in the production of gases containing sulfur trioxide.

In multistage converters for the production of gases containing sulfur trioxide from gases containing sulfur dioxide and oxygen in a catalytic process it is already known to effect direct cooling of the reaction gases between the individual reaction stages by the addition of cold gases containing sulfur dioxide and oxygen or cold air. In the application Serial No. 270,283, filed on February 6, 1952, now abandoned, by Adolf Johannsen, Wilhelm Pfannmueller and Friedrich Hettler, there is proposed to effect said direct cooling of the partially reacted gases between the first stages predominantly by mixing therewith further amounts of roaster gas and between the later stages by the additional admixture or the sole addition of cold oxygen-containing gases, in particular air. In order that a uniform progress of the reaction should be ensured over the entire cross-section in the next catalyst layer, these cold gases must be mixed as homogeneously as possible with the hot reaction gases. For this purpose the installation of current-breaking insertions, for example umbrella-shaped insertions, in the spaces between the individual reaction stages has already been proposed. Such insertions, however, necessitate a great furnace height, and moreover they are subject to continuous scaling, even when alloy steels are used, because they are exposed without cooling to the hot contact gases, and in consequence thereof they cause incrustations of the catalyst and therefore a gradual increase in the gas resistance in the furnace.

We have now found that these drawbacks can be obviated in a simple and certain manner by carrying out the intermediate cooling of the reaction gases by the admixture of colder gases in a plurality of mixing nozzles which are preferably arranged in the form of nozzle plates between each two catalyst layers.

This arrangement is illustrated diagrammatically and by way of example only in Figure 1 of the accompanying drawings. The gases enter through inlet 1 into a heat exchanger 2 in which they are heated up by the reaction gases coming from the first catalyst layer 3 to the initiation temperature of the catalyst. They then enter the first catalyst layer 3 from above, pass therethrough and thence flow back into the heat exchanger 2 where they give up part of their heat to the freshly supplied gases. They then pass through a channel 4 into the second catalyst stage 5 and, after passing therethrough, are mixed in a nozzle plate 7 with cold roaster gas supplied at 6 before they are supplied to the third catalyst stage 8. After leaving this stage they are mixed in a nozzle plate 10 with dry cold air introduced at 9 and then led through the catalyst layer 11. This mixing with dried fresh air is repeated in the nozzle plates 13 and 16 which precede the reaction stages 14 and 17. The reacted gases leave the furnace at 18.

Figure 2 is a section of part of the mixing nozzle plate on a larger scale. The reaction gases flow downwardly at 21 and are intimately mixed with the cooling gas which is introduced into the nozzle plate at 22 and leaves through the nozzles 23, before they leave the nozzle plate at 24.

In order to maintain a temperature which is uniform over the whole cross-section of the furnace, it is advantageous to subdivide the nozzle plate into individual sections and to supply the cooling gas to each of the sections separately and independently of the other sections.

The apparatus according to this invention ensures not only that there is a good and thorough mixing but also that the impact against the catalyst layer following the nozzle plate is very uniform because the gases strike the catalyst layer perpendicular thereto. The mixing takes place completely uniformly over the entire cross-section of the catalyst layer even when the ratio of reaction gas to fresh gas is, for example, 50 parts by volume to 1 part by volume. The pressure loss is very small and amounts to only a small fraction of that which occurs by the passage of the gases through channels at high speed.

Since the nozzles and the connecting members belonging thereto are cooled by the introduced colder additional gas, and moreover can be made in a simple and advantageous manner from ceramic material which is absolutely stable to attack by acid gases at the temperatures prevailing in the contact furnace, any incrustation of the catalyst, such as has always been observed in the constructions hitherto usual which used uncooled metallic umbrella-shaped inserts, baffle plates and the like, is avoided.

In order to keep the temperature of the reaction gases upon entry into the last catalyst layers as low as possible for the purpose of obtaining a conversion of 98 percent or more, because the equilibrium of the reaction

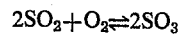

$$2SO_2 + O_2 \rightleftharpoons 2SO_3$$

is displaced at high temperatures towards the side of the splitting of $SO_3$ while yet not allowing the temperature to fall below the initiation temperature of the catalyst, it is necessary to keep the temperature of the reaction gas upon entry into the last reaction stage as constant as possible a few degrees above the initiation temperature of the catalyst. For this purpose the cooling air must be continuously regulated according ot the fluctuations in the concentration of the roaster gases.

This regulation can be effected according to this invention by installing a temperature-responsive member beneath the nozzle plate in the last reaction stages of the above-described furnace arrangement, the said temperature-responsive member acting as an impulse transmitter to regulate the regulating valves of the relevant pipes for cooling air so that the desired temperature is automatically kept constant.

The arrangement and operation of such a temperature-responsive member will be described with reference to Figure 3 of the accompanying drawings which illustrates diagrammatically the lower part of a furnace. 31, 32 and 33 are the lower catalyst layers of the furnace, 34 is a nozzle plate and 35 is a temperature-responsive member. The member 35 actuates, through a temperature regulator 36, a membrane valve 38 controlled by compressed air supplied through a pipe 37, and the valve 38 in turn regulates the supply of cold air through pipe 39 to the nozzle plate at 40.

We claim:

1. In a multi-stage converter for the oxidation of sulfur dioxide to sulfur trioxide by the contact process, the improvement comprising: a plurality of mixing nozzles disposed between a pair of successive conversion stages and extending over the cross-section of the converter and arranged to discharge gases uniformly over said cross-section, said nozzles each including means to receive reaction gases from one stage; means to introduce a supply of a cooling gas into an enclosed zone extending over said cross-section and surrounding each of said nozzles; means to introduce said supply of a cooling gas from said enclosed zone into each of said nozzles such that said reaction gases and cooling gas are mixed therein; and exit means in each nozzle to discharge the resulting mixture of gases therefrom to the succeeding stage.

2. In a multi-stage converter for the oxidation of sulfur dioxide to sulfur trioxide by the contact process, a gas mixer disposed between a pair of successive conversion stages comprising: a nozzle plate forming an enclosed zone extending over the cross-section of the converter; a plurality of mixing nozzles extending through said enclosed zone and arranged in said nozzle plate to discharge gases uniformly over said cross-section, said nozzles each including means to receive reaction gases from one stage; means to introduce a supply of a cooling gas into said enclosed zone surrounding each of said nozzles; means to introduce said supply of a cooling gas from said enclosed zone into each of said nozzles such that said reaction gases and cooling gas are mixed therein; and exit means in each nozzle to discharge the resulting mixture of gases therefrom substantially perpendicularly against the succeeding stage.

3. In a multi-stage converter for the oxidation of sulfur dioxide to sulfur trioxide by the contact process, a gas mixer disposed between a pair of successive conversion stages comprising: a nozzle plate forming an enclosed zone extending over the cross-section of the converter; a plurality of mixing nozzles extending through said enclosed zone and arranged in said nozzle plate to discharge gases uniformly over said cross-section, said nozzles each including means to receive reaction gases from one stage; means to introduce a supply of a cooling gas into said enclosed zone surrounding each of said nozzles; means to introduce said supply of a cooling gas from said enclosed zone into each of said nozzles such that said reaction gases and cooling gas are mixed therein, said enclosed zone in said nozzle plate being subdivided into individual sections and said cooling gas being introduced to each of said sections separately and independently of the remaining sections; and exit means in each nozzle to discharge the resulting mixture of gases therefrom to the succeeding stage.

4. In a multi-stage converter for the oxidation of sulfur dioxide to sulfur trioxide by the contact process, a gas mixer disposed between a pair of successive conversion stages comprising: a nozzle plate forming an enclosed zone extending over the cross-section of the converter substantially parallel to said stages; a plurality of mixing nozzles extending through said enclosed zone and arranged in said nozzle plate to discharge gases uniformly over said cross-section, said nozzles each including means to receive reaction gases from one stage in a direction substantially parallel to the direction of flow of said reaction gases; means to introduce a supply of a cooling gas into said enclosed zone surrounding each of said nozzles; means to introduce said supply of a cooling gas from said enclosed zone into each of said nozzles such that said reaction gases and cooling gas are mixed therein; and exit means in each nozzle to discharge the resulting mixture of gases therefrom substantially perpendicularly against the succeeding stage, said nozzles and their connecting members being made of ceramic material resistant to the chemical attacks of the reaction gas.

5. In the manufacture of gases containing sulfur trioxide by the multi-stage catalytic reaction of gases containing sulfur dioxide and oxygen in which the reaction gases are cooled by the supply of cooling gas between successive stages, the improvement which comprises: intimately and uniformly mixing a plurality of individual portions of said reaction gases leaving one stage with a corresponding plurality of portions of said cooling gas at individual points extending uniformly over the path of flow of said reaction gases between a pair of successive stages; and directing the resulting uniform mixture from said individual points to the succeeding stage.

6. In the manufacture of gases containing sulfur trioxide by the multi-stage catalytic reaction of gases containing sulfur dioxide and oxygen in which the reaction gases are cooled by the supply of cooling gas between successive stages, the improvement which comprises: intimately and uniformly mixing a plurality of individual portions of said reaction gases leaving one stage with a corresponding plurality of portions of said cooling gas at individual points extending uniformly over the path of flow of said reaction gases between a pair of successive stages, said mixing being effected by subdividing said plurality of individual portions of said reaction gases into individual sections and introducing said cooling gas separately and independently into each of said sections; and directing the resulting uniform mixture from said individual points to the succeeding stage.

References Cited in the file of this patent

UNITED STATES PATENTS

| | | |
|---|---|---|
| 677,670 | Krauss et al. | July 2, 1901 |
| 1,970,923 | Spalding | Aug. 21, 1934 |
| 2,104,858 | Ferguson | Jan. 11, 1938 |

OTHER REFERENCES

Miles: Manufacture of Sulfuric Acid, page 222, Contact Process, vol. IV, N. Y., Van Nostrand Co., 1925.